United States Patent [19]
Mutzke

[11] 4,183,888
[45] Jan. 15, 1980

[54] METHOD OF COATING WIRE

[75] Inventor: Diethelm Mutzke, Schulenburg, Fed. Rep. of Germany

[73] Assignee: Kabel-und Metallwerke Gutehoffnungshutte AG, Hanover, Fed. Rep. of Germany

[21] Appl. No.: 390,893

[22] Filed: Aug. 23, 1973

[30] Foreign Application Priority Data

Aug. 30, 1972 [DE] Fed. Rep. of Germany ....... 2242655

[51] Int. Cl.[2] ............................................. B29F 3/10

[52] U.S. Cl. ............................ 264/131; 118/DIG. 5; 118/DIG. 18; 264/70; 264/174; 427/120

[58] Field of Search ................. 264/174, 131, 69, 129, 264/70-71; 117/232, 47 H; 118/DIG. 5, DIG. 18; 161/175, 216; 427/117-120, 356; 428/327

[56] References Cited

U.S. PATENT DOCUMENTS

| | | | |
|---|---|---|---|
| 3,100,136 | 8/1963 | D'Ascoli et al. | 264/174 |
| 3,532,783 | 10/1970 | Pusey et al. | 264/174 |
| 3,669,738 | 6/1972 | Cottis et al. | 117/232 |

*Primary Examiner*—Jeffery R. Thurlow
*Attorney, Agent, or Firm*—Smyth, Pavitt, Siegemund, Jones & Martella

[57] ABSTRACT

A plastic coating is provided on a heated wire in that powder is poured around the heated wire for adhesion thereto; the wire is then passed through a funnel shaped heating chamber, wherein the wire encounters chamber space narrowing radially progressively in direction of passing, for heating and melting the powder completely, the melted plastic is uniformly distributed thereby about the wire when leaving the chamber in special cases, foam can be deposited on the still warm and sticky coating.

5 Claims, 2 Drawing Figures

METHOD OF COATING WIRE

BACKGROUND OF THE INVENTION

The present invention relates to depositing a plastic layer and coating onto a metallic wire in such a manner that the plastic positively and firmly adheres to the wire.

Wires have been coated in such a manner generally, and are, for example, used as individual conductors in electrical cables, as coils, or as inner conductors in a coaxial, high frequency transmission line. Many different methods have become known here for insulating a wire by a plastic coating, but all known methods are quite complicated and expensive. A simple technique involves applying such plastic only once, but almost always the disadvantage was encountered that the layer thickness was not uniform. If the plastic layer is thin to begin with, difficulties may arise particularly in the electric properties and during subsequent use of such a conductor. Therefore, depositing multiple layers or strata was heretofore deemed inevitable for obtaining uniform layer thickness.

SUMMARY OF THE INVENTION

It is an object of the present invention to provide for a method for layering and coating a wire to obtain uniform layer thickness without requiring multiple sequential layering.

In accordance with the preferred embodiment of the invention it is suggested to apply powder onto the wire by loosely pouring the powder around and onto the heated wire to obtain adhesion as well as cohesion. The wire so treated is passed through a funnel shaped heating chamber, narrowing in direction of passage for progressively melting the powder so that the liquified plastic distributes uniformly about the wire. The wire is then withdrawn and processed further as necessary.

The invention offers the specific advantage that a plastic powder bead is formed on the wire as moving through this particular chamber, and as excess plastic is stripped off the wire upon leaving the chamber, stripping results in a uniformly distributed layer and coating. The plastic to be used preferably for such a coating may be a copolymer of ethylene with or without vinylacetate added.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawing, FIG. 1 shows a drum 1 and bare metal wire 2, e.g. copper wire is reeled from that drum. The wire 2 is moved in direction of arrow 3, and passes through a heater 5, for example, an high frequency heating coil. The wire leaves the heating device 5 at a temperature somewhat above the melting point of the plastic, taking into account that some cooling is effective before powder is applied.

Figure 1:
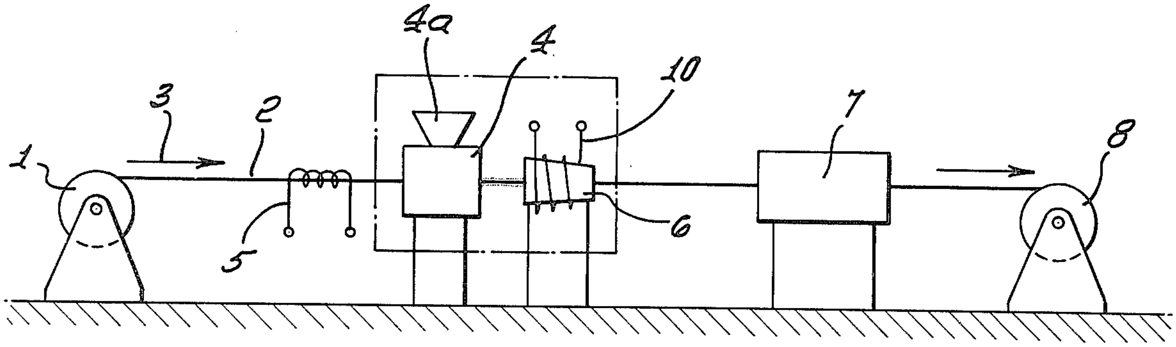
FIG. 1 is a schematic view of the equipment generally as used for carrying out the method in accordance with the preferred embodiment of the invention.

Plastic powder is applied to the heated wire in a vibrating conveyor 4 having a receiving element of V-shaped cross section, and being open at the bottom. Powder drops from a bin 4*a* into the conveyor 4 to replenish the supply therein. The wire 2 passes close to and along the bottom apex of the V but on the outside and receives powder from above. The receiving element in the conveyor 4 vibrates to make sure that powder is uniformly deposited on the wire when passing through. The conveyor 4 has suitable entrance and exit openings so that the wire can enter and leave accordingly.

As the wire leaves conveyor 4, it passes soon into a heating chamber 6 to be described below and in greater detail with reference to FIG. 2. Suffice it to say presently that heating chamber 6 is surrounded by a heating wire 10 and has a conically or funnel-shaped interior, narrowing in direction of wire propagation. As indicated schematically by a dash-dot line, vibrator-conveyor 4 and heating chamber 6 are combined in a common housing. The wire when leaving heating chamber 6 has a uniformly thick plastic layer and passes through a cooling facility 7 before being wound and reeled onto a drum 8.

Figure 2:
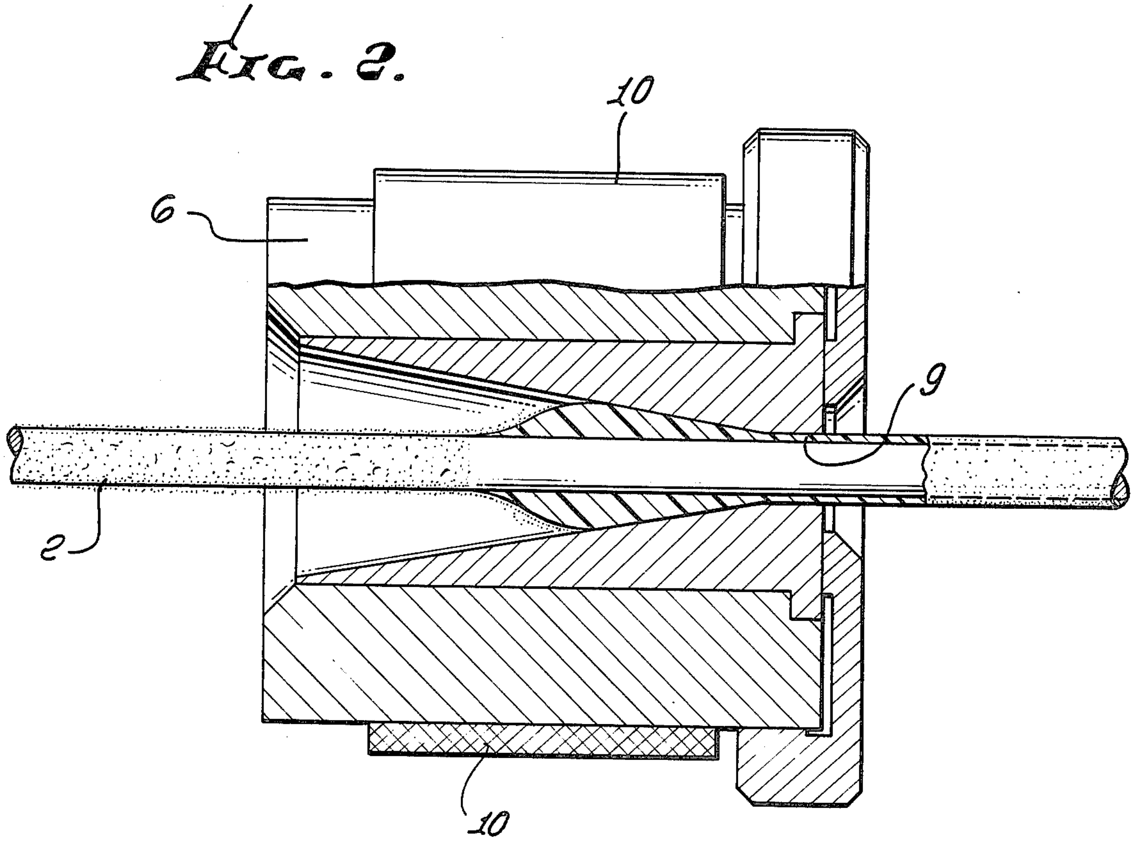
FIG. 2 shows on an enlarged scale, a heating chamber used in the equipment of FIG. 1.

Turning now to FIG. 2, one can see that wire 2 with adhering powder passes into funnel-shaped heating chamber 6 through a relatively wide opening thereof. The heating chamber has a heating coil 10. As any portion of the wire propagates into the interior of chamber 6, the sides narrow down to the funnel shaped or conical configuration, terminating in a rather narrow opening 9. That opening 9 has width so that the clearance equals the desired layer thickness. Or, to state it differently, the diameter of opening 9 exceeds the diameter of wire 2 by twice the layer thickness.

The heater 10 of chamber 6 melts the plastic on the wire completely, and the plastic can and will flow all around the wire. The conical configuration strips excess of the plastic at the opening 9, actually filling the interior of chamber 6 with plastic soon after the coating process has begun. In fact, the plastic forms a bulge of more or less conical configuration about the wire. The bulge has radially larger dimensions than the clearance space between the wire proper and opening 9. Therefor, a uniformly thick plastic layer is provided onto, or, more correctly, remains on the wire as it leaves through opening 9. Excess plastic material may dripp off the large entrance of heating chamber 6. But it can readily be seen, that preheating of the wire 6 of heating station 5 could be adjusted so that the amount of powder ahering and cohering when leaving powder depositer 4 is not much larger than the amount of powder needed for coating.

It was found that the invention can be practiced best when using a gummy plastic capable of adhesion. For example a copolymer of ethylene is well suited here. The adhesiveness of that material is fully developed in the chamber 6. A layer thickness can be obtained ranging from 5 $\mu$m to about 500 $\mu$m (or $\frac{1}{8}$ of a mill to about 12.5 mills), whereby the layers are uniform in each instance. The thickness of the layer or coating is, of course determined by the clearance between opening 9 and wire 2.

Such adhesive layers are of particular interest when the wire is to be used as inner conductor in a coaxial high frequency cable or transmission line, and if the dielectric in that line is a solid or a foamed plastic. Particularly such foamed plastic will readily adhere to the adhesive plastic on the wire. Without such adhesion, no firm bond is established between foam and wire. Under such circumstances, foam will be provided onto and around the coated wire preferably while the coating is still warm and sticky. Since an adhesive is used as cover and coating on the wire, the foam will adhere thereto, and there is no danger that a gap forms for one reason or another between the foam and the inner conductor wire. As a consequence, the high frequency transmission line is considerably improved as to its electrical properties and performance, and particularly the reflection factor is vastly improved. The dielectric may be polyethylene, in foamed configuration, but could be solid in other cases. In such a case the wire should be coated with an adhesive plastic that is comprised of a copolymer of ethylene and vinylacetate. The wire is heated to about 130° C. by heater 5 and the plastic is heated to about 190° C. in chamber 6.

The invention is not limited to the embodiments described above but all changes and modifications thereof not constituting departures from the spirit and scope of the invention are intended to be included.

I claim:

1. Method for providing a plastic coating of electrically insulative plastic on a continuously, horizontally running metal wire comprising the steps of:

heating progressive portions of the wire;

continuously depositing powder of such plastic material onto the heated portions of the horizontally running and extending wire by pouring such powder onto the wire from above;

passing the wire with powder adhering thereto through a funnel shaped heating chamber, wherein the wire encounters chamber space narrowing radially progressively in direction of passing, for heating and melting the powder completely, the melted plastic as carried along on the wire and encountering narrowing portions of the funnel-shaped chamber forming a bulge around the wire inside of the chamber, so that the melted powder is being uniformly distributed as a layer about the wire when leaving the chamber; and withdrawing the wire from the chamber for further processing while stripping excess plastic off the wire in that the wire passes through a relatively narrow opening of the chamber upon leaving the chamber at a relatively narrow end thereof;

the narrow diamensions of the chamber end where the wire leaves the chamber determining the thickness of the layer.

2. A method as in claim 1, wherein the plastic is an adhesive upon being heated.

3. A method as in claim 1, wherein the powder placing step is provided by passing the wire below a vibrating conveyer of V-shaped cross section into which the powder is poured, the conveyor being open at the bottom.

4. A method as in claim 1, wherein a dielectric is provided subsequently onto the plastic layer as formed on the wire, the plastic selected to have adhesive property.

5. A method as in claim 1 wherein a powder is used which includes a copolymer of ethylene.

* * * * *